No. 680,779. Patented Aug. 20, 1901.
J. H. KING.
MILK PAIL.
(Application filed Nov. 8, 1900.)
(No Model.)

Witnesses

Inventor
John Heustis King.
by
Attorneys

THE NORRIS PETERS CO., PHOTO-LITHO., WASHINGTON, D. C.

UNITED STATES PATENT OFFICE.

JOHN HEUSTIS KING, OF GARRITY, ALABAMA.

MILK-PAIL.

SPECIFICATION forming part of Letters Patent No. 680,779, dated August 20, 1901.

Application filed November 8, 1900. Serial No. 35,847. (No model.)

*To all whom it may concern:*

Be it known that I, JOHN HEUSTIS KING, a citizen of the United States, residing at the southwest corner of Parham and Adams streets, Garrity, in the county of Mobile and State of Alabama, have invented certain new and useful Improvements in Milk-Pails; and I do declare the following to be a full, clear, and exact description of the invention, such as will enable others skilled in the art to which it appertains to make and use the same.

This invention relates to a non-spillable milk-pail.

The object of the invention is to provide a pail of this character provided with a simple and effective milk receiving and straining attachment so constructed as to allow the milk to freely flow down into the pail under ordinary circumstances while milking, but to cut off the outflow of the milk in the event of the pail being kicked or knocked over, and thereby prevent spilling.

With this and other minor objects in view the invention consists of certain novel features of construction, combination, and arrangement of parts, as will be hereinafter more fully described, and particularly pointed out in the appended claim.

Figure 1:
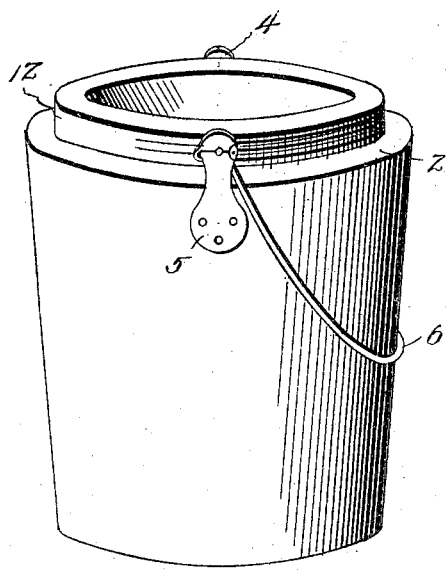
Figure 2:
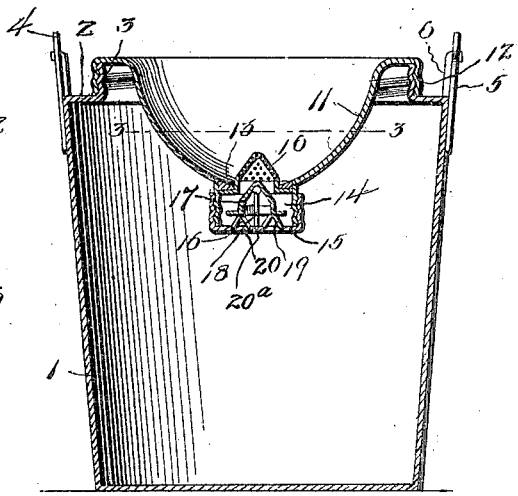
Figure 3:
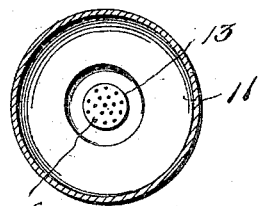
Figure 4:
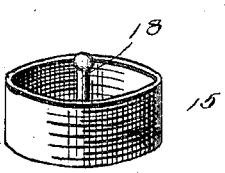
Figure 5:
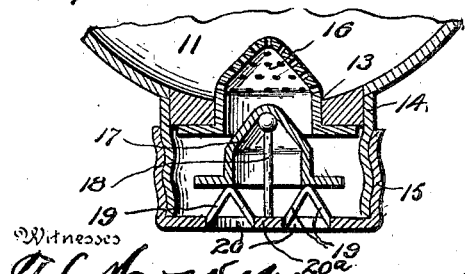
Figure 6:
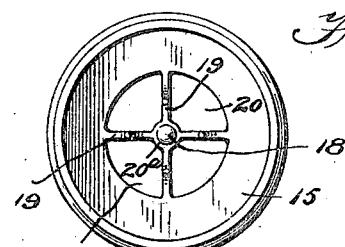

In the drawings hereto attached and forming a part of this specification, Figure 1 is a perspective view of the device as adapted for use as a milk-pail. Fig. 2 is a central vertical longitudinal section of the same. Fig. 3 is a sectional plan view on line 3 3 of Fig. 2. Fig. 4 is a detail perspective view of the cap. Fig. 5 is a detail sectional view through the strainer, valve, and valve-casing on an enlarged scale. Fig. 6 is a top plan view of the cap 15.

Referring now more particularly to the drawings, the numeral 1 represents a pail or vessel provided at top with an inwardly-extending rim 2, terminating in a vertical flange 3, which is preferably screw-threaded, as shown. On opposite sides of the top portion of the pail are disposed ears 4 and 5 to receive the journals of a pivoted bail-handle 6. A receiving-bowl 11 is adapted to be suspended in the pail and is provided at top with a depending screw-threaded flange 12 to engage the flange 3 of the pail and securely connect the bowl thereto, and said bowl is also provided in its bottom with a port or opening 13 and a surrounding screw-threaded central depending flange 14. A cap 15 engages this flange and forms therewith a chamber in communication with the opening 13 and confining a conical strainer 16 and conical valve 17. The strainer 16 comprises a flanged ring of spring metal and a conical cap of woven wire or perforated material, and occupies the opening 13, the said ring being adapted to frictionally engage the wall of the opening, while the flange thereon holds the strainer from upward displacement. The valve 17 is similarly constructed, but is smaller than the strainer, so as to seat therein, and its cone portion is imperforate to cut off the flow of milk when the valve is so seated. The valve is supported by a vertical pin 18 and an elevated portion 19 of the cap 15, said elevated portion consisting of spaced inverted-V-shaped arms or strands radiating from a center piece 20ª, which carries the pin 18, and extending across an annular passage or opening 20, formed in the bottom of the cap 15. The strands 19 and center piece 19ª thus form a skeleton or open-work frame, through which the milk may flow to the opening 20 and which supports the pin 18.

In practice it will be understood that in milking or in straining at any time subsequent to milking the milk is received into the bowl 11, down the inclined sides of which it flows toward the opening 13, and passes through the strainer 16 and over the valve 17 down into the pail through the opening 20, the milk in its passage being thoroughly strained of all foreign matter. This is the operation under ordinary conditions when the pail stands vertical. When, however, the pail is kicked or knocked over, the pressure of the milk against the valve 17 will seat said valve and prevent the escape of any milk through the strainer 16, and consequently the spilling or waste of any milk on overturning. It will be noted that the parts of the pail are adapted to be readily assembled and disassembled, thus providing for the renewal of a worn-out or injured part at small expense and without the necessity of discarding any other parts.

Having thus fully described my invention, what I claim, and desire to secure by Letters Patent, is—

In a non-spillable milk-pail, the combination of a pail or vessel, a bowl removably suspended therein and provided with a port or opening and a depending flange, a cap engaging said flange and forming therewith a chamber, said cap having a bottom opening, an open-work frame formed of radial upwardly-bent strands extending across said opening, a supporting-pin connected to the center of said frame and projecting upwardly therefrom, a strainer removably mounted in said port and comprising a flanged ring and a perforate conical cap, said ring-flange adapted to frictionally engage the wall of the port; and a valve arranged in said chamber and supported by said pin and open-work frame, said valve comprising a flanged ring and a conical imperforate cap, the latter receiving the supporting-pin and adapted to seat within and to close said strainer when the pail is overturned, substantially as described.

In testimony whereof I have hereunto set my hand in presence of two subscribing witnesses.

JOHN HEUSTIS KING.

Witnesses:
RUDOLPH FREDERICK STROECKER,
BLAKE ELLIOT GHENT.